United States Patent [19]
Rodrigues

[11] 3,734,059
[45] May 22, 1973

[54] RESTRAINING DEVICE FOR QUADRUPEDS

[76] Inventor: Antonio Rodrigues, 8302 18th Avenue, Lemoore, Calif. 93245

[22] Filed: Mar. 4, 1971

[21] Appl. No.: 120,968

[52] U.S. Cl. ..................................119/27, 119/149
[51] Int. Cl. ..........................A01j 01/00, A01k 01/00
[58] Field of Search..................119/27, 11, 14.03, 119/149

[56] References Cited

UNITED STATES PATENTS

| | | | |
|---|---|---|---|
| 3,392,709 | 7/1968 | Janson et al. | 119/27 |
| 3,543,723 | 12/1970 | Gilst | 119/27 |
| 1,797,159 | 3/1931 | Shafer | 119/27 X |
| 2,601,845 | 7/1952 | Youngman | 119/27 |
| 3,448,725 | 6/1969 | Holm et al. | 119/27 |
| 1,202,184 | 10/1916 | Gutenkunst | 119/27 |
| 3,460,515 | 8/1969 | Page et al. | 119/14.03 X |

*Primary Examiner*—Russell R. Kinsey
*Assistant Examiner*—James H. Czerwonky
*Attorney*—Huebner & Worrel

[57] ABSTRACT

A restraining device for confining quadrupeds, particularly suited for use in restraining unruly animals, such as ill-tempered cows and the like, for various handling purposes, including facilitating milking operations. The device is characterized by a plurality of pairs of generally parallel restraining rails pivotally coupled to a manger of a type including a plurality of yokes for simultaneously receiving the heads of a plurality of animals to be restrained, and an actuator coupled therewith for imparting thereto a lifting force, whereby a simultaneous, pivotal repositioning of the rails between angularly spaced positions readily is accommodated for receiving and restraining the animals. The rails are mounted on the device to permit their substantially vertical oscillation about a horizontal axis, as well as their substantially horizontal oscillation about a vertical axis, whereby the rails pivot in orthogonally related planes.

11 Claims, 7 Drawing Figures

ANTONIO A. RODRIGUES
INVENTOR

Huebner + Worrel
ATTORNEYS

ANTONIO A. RODRIGUES
INVENTOR

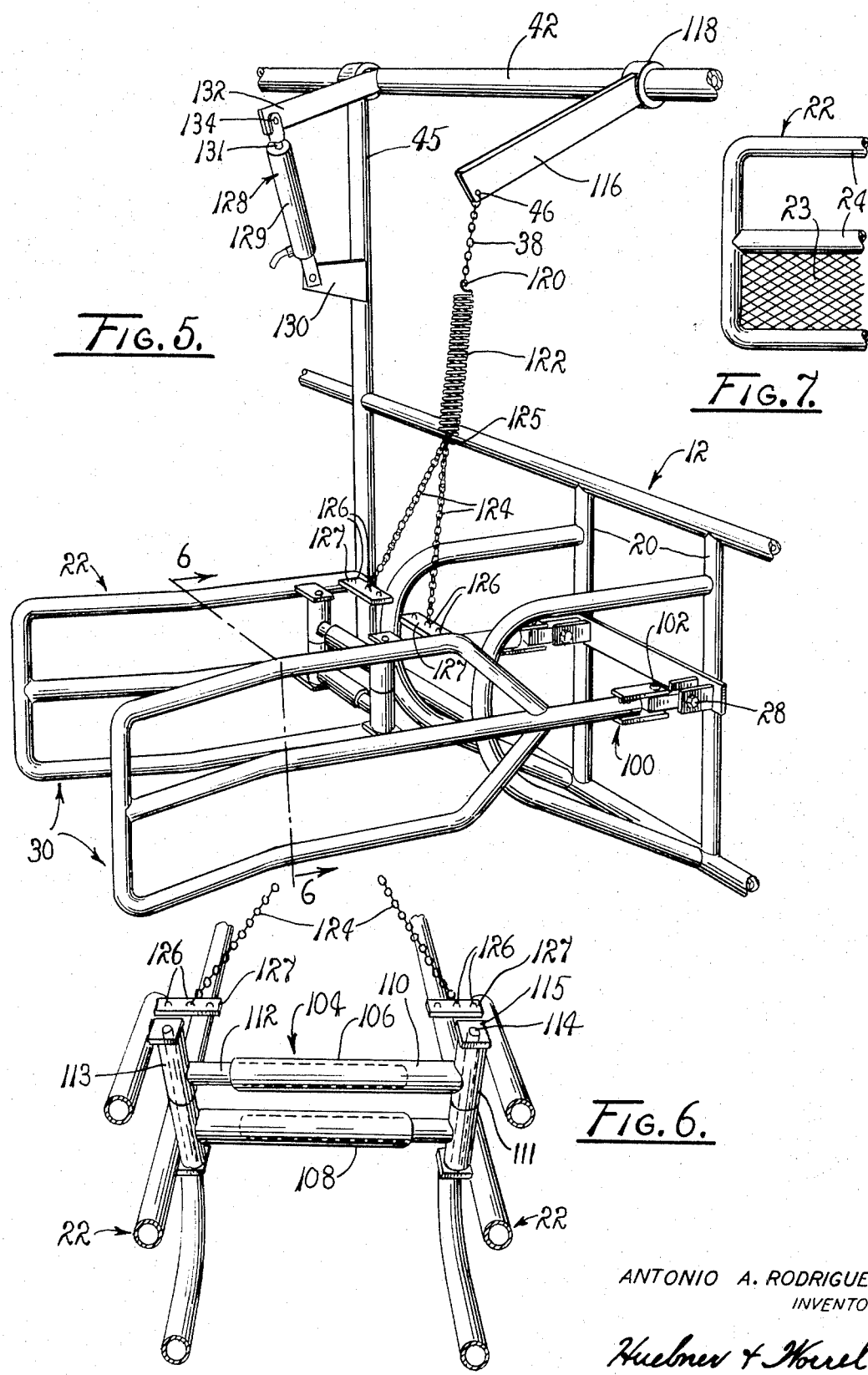

RESTRAINING DEVICE FOR QUADRUPEDS

BACKGROUND OF THE INVENTION

The invention relates to restraining devices for substantially confining unruly quadrupeds, particularly ill-tempered milking stock and the like.

While the art of restraining quadrupeds, both wild and domestic and for various purposes, is notoriously old, there currently exists a need for a practical and economic restraining device which readily can be employed in restraining domestic animals, such as milch cows for purposes of accommodating milking operations of the type usually performed in extracting milk from producing cows of dairy herds.

Due to the fact that certain breeds of milch cows are quite strong, as well as massive, their ability to injure workmen by kicking and squeezing the workmen between their bodies frequently renders milking operations hazardous. Of course, the prevailing hazards are increased during the course of training unbroken cows to take mechanical milking machines, since such cows frequently tend to be strong, high-spirited and gifted with impatience.

Various attempts have been made to solve these problems. Such attempts include a use of flank-clamps, fetters, yokes, and a use of herringbone stanchions. However, all of the known devices and systems currently employed suffer from various defects including complexity, cost and impracticality.

OBJECTS AND SUMMARY OF THE INVENTION

It is therefore an object of the instant invention to provide an improved restraining device for quadrupeds.

It is another object to provide a simple and practical restraining device which readily accommodates a simultaneous handling of livestock.

It is another object to provide an improved restraining device for use in substantially confining milch cows against lateral movement.

It is another object to provide an improved restraining device for protecting workmen from ill-tempered milch cows in the performance of milking operations.

It is another object to provide an improved restraining device for use in substantially confining a plurality of milch cows as the cows are prepared and subsequently milked through a use of mechanical milking machines.

It is another object to provide an improved restraining device which readily can be mounted in existing dairy barns and employed for restraining young, unbroken milch cows during milking and similar handling operations.

These and other objects and advantages are achieved through a restraining device particularly suited for use with existing mangers of the type having a plurality of yoke-like openings for simultaneously receiving the heads of a plurality of milch cows and including parallel restraining rails pivotally supported for vertical and horizontal in laterally spaced, vertical planes, whereby a plurality of cows simultaneously can be received and subsequently restrained by the rails, and an actuator operatively associated with the rails for simultaneously supporting the rails in a manner such that the rails can readily be elevated for receiving a plurality of cows and subsequently lowered into a confining relationship therewith.

BRIEF DESCRIPTION OF THE DRAWINGS

FIG. 5 is a fragmented perspective view of another form of the device shown in FIG. 1.

FIG. 6 is a fragmentary perspective view, taken generally along line 6—6 of FIG. 5.

FIG. 7 is a fragmented view of a modified rail employable in the device of the instant invention.

DESCRIPTION OF THE PREFERRED EMBODIMENTS

Figure 1:
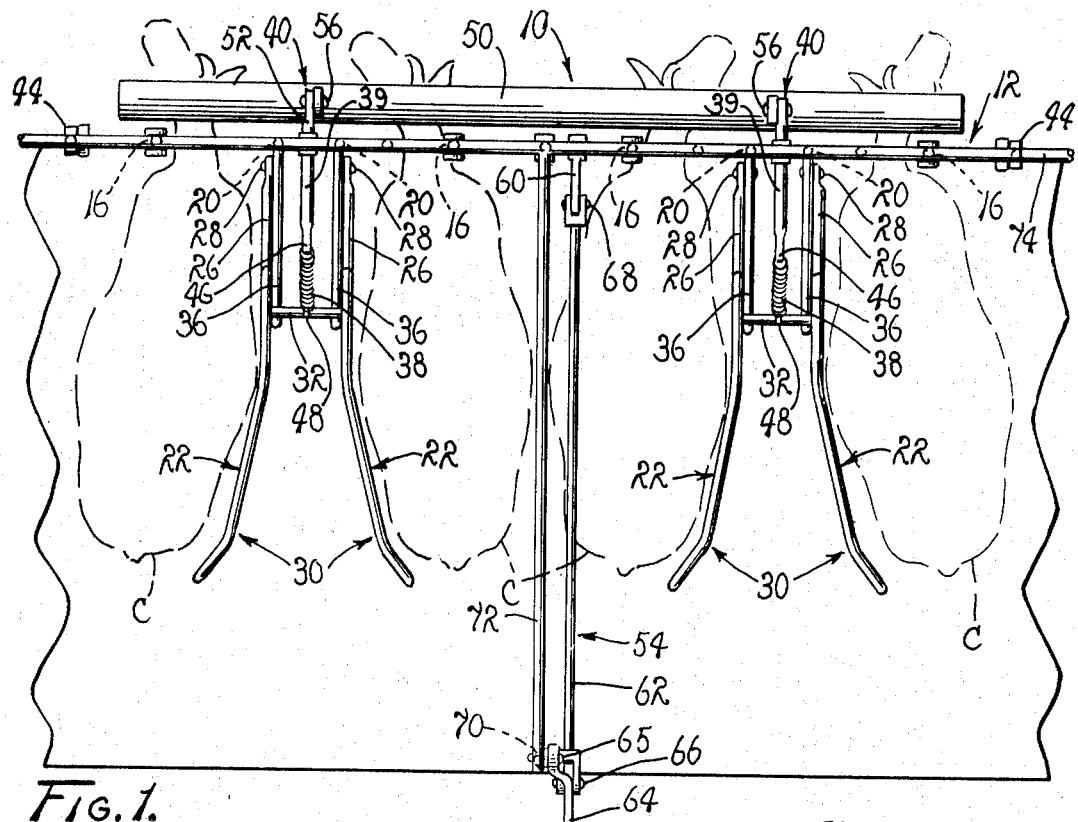
FIG. 1 is a top plan view of a first form of a restraining device embodying the principles of the instant invention.

Referring now to the drawings wherein like reference characters designate like or corresponding parts throughout the several views, there collectively is illustrated in FIGS. 1 through 6 a restraining device, generally designated 10, which embodies the principles of the instant invention.

As currently employed, the restraining device 10 serves to restrain and substantially confine a plurality of milch cows, designated C, during milking operations. However, it should be apparent that the device 10 can be employed in numerous other livestock handling operations of various types common to animal husbandry, such as vaccinating, branding, administration of medication, and the like. While the device is particularly suited for use in handling cows, it is readily apparent that the device can be employed equally as well in handling various types of quadrupeds such as horses, hogs, goats and the like, whether of a domesticated or undomesticated variety.

The device 10, as shown in FIGS. 1 through 4, is particularly suited for use where a relatively small number of animals simultaneously are restrained and/or where access to a source of pressurized fluid is limited. Preferably, the restraining device 10 is employed with a manger 12 of a convenient design. In practice, the manger is of a type commonly found in dairy barns and includes a plurality of side-by-side, releasable head-locks 14, of a yoke-like construction, through which a plurality of milch cows simultaneously extend their heads for restraint during milking operations. Each of the head-locks 14 includes a pivotally supported bar 16 coupled with a transversely reciprocable actuator bar, not shown. The actuator bar, as commonly employed, imparts pivotal rotation to the bars 16 about pivot pins 18, so that the manger 12 can be opened for simultaneously receiving the heads of a plurality of cows and subsequently closed for simultaneously locking the heads of the cows in a position suitable for restraining thereagainst unwanted fore-and-aft movement.

Since the manger 12, as illustrated in FIGS. 1 through 4, forms no specific part of the instant invention and is of a commercially available design, a detailed description thereof is omitted in the interest of brevity. It is to be understood, however, than when employed in milking operations, the manger normally receives heads of a plurality of cows C, which simultaneously are confined for causing the cows generally to be oriented in a side-by-side relationship, laterally spaced a distance sufficient for accommodating passage therebetween, of workmen bearing milking equipment and the like.

FIRST FORM

The manger 12 of the type currently employed normally includes a plurality of vertical supports 20. These supports, in effect, serve as anchor posts for pivotally supporting the ends of a plurality of laterally extended restraining rails 22.

Each of the restraining rails 22 includes a plurality of spaced, substantially parallel bars 24 which terminate in a terminal beam 26. The restraining rails 22 preferably are configured in a manner such that they generally conform to the side surfaces of an animal being restrained so that the animals can readily be received and supported against fore-and-aft as well as lateral movement. If desired, an expanded mesh screen 23, FIG. 7, can be positioned between the bars 24 in order to confine the feet of animals.

Each of the beams 26, in turn, is pivotally coupled to a vertical support 20 through a pivotal coupling which includes a pivot pin 28. Hence, it should be apparent that each of the restraining rails 22 is supported for pivotal displacement, in a substantially vertical plane, about a pivot pin 28.

In practice, the restraining rails 22 are united in pairs, each pair forming one of a plurality of separator units 30. In the first form of the invention this union preferably is achieved through a transverse coupling bar 32 provided for each separator unit. In practice, these bars extended between the paired rails are secured thereto by welding and the like. Hence, it is to be understood that the rails 22 of each separator unit 30 are supported for simultaneous oscillation about their respective pivot pins 28 so that the unit 30 can pivotally be displaced.

Lateral support is afforded each separator unit 30 through a suitable lateral support frame 34. Preferably, the support frame 34 includes a pair of laterally extended U-shaped bars 36 welded to the supports 20, in a laterally spaced relationship and in a manner such that they are contiguous with the adjacent vertical surfaces of each pair of restraining rails 22 for thus imparting opposed lateral support to the rails of each of the separator units 30.

Each of the units 30 is, in effect, an oscillating unit supported in suspension by a flexible tension member 38, such as a common chain, depending from a pivotally supported arm 39. In practice, each arm is extended from one of a plurality of rotatable bell cranks 40 so supported that each of the units 30 can pivotally be raised and lowered through an angular displacement of the bell crank.

Figure 2:
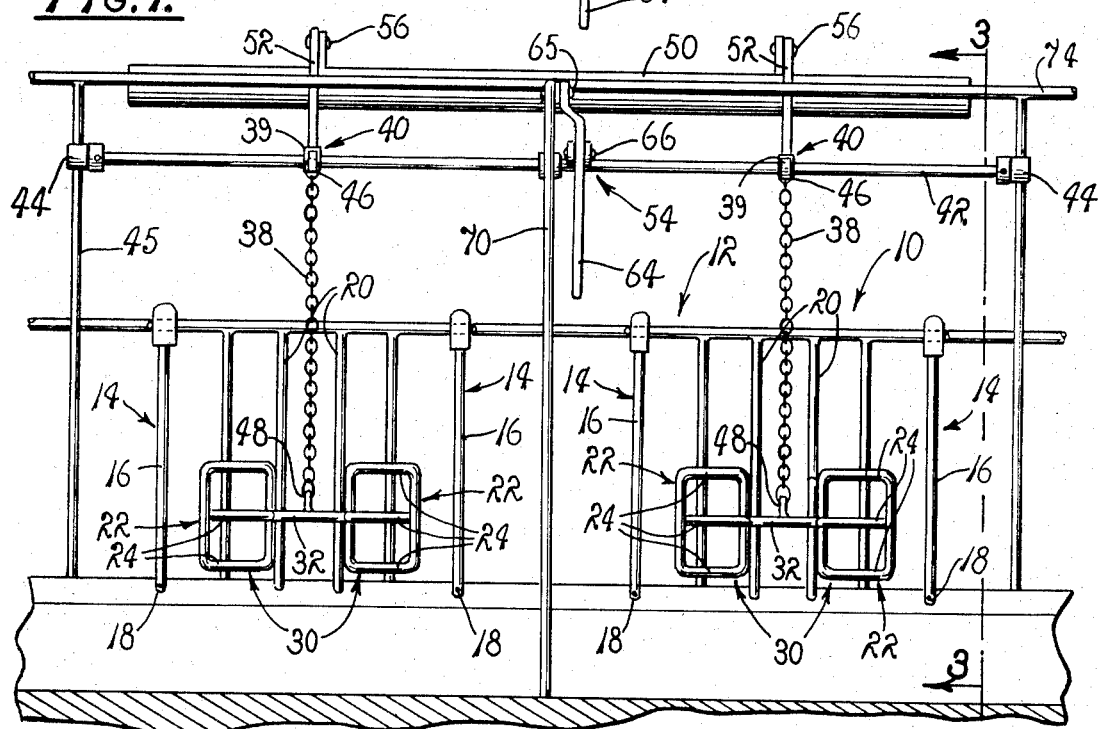
FIG. 2 is an elevation of the restraining device shown in FIG. 1.
Figure 3:
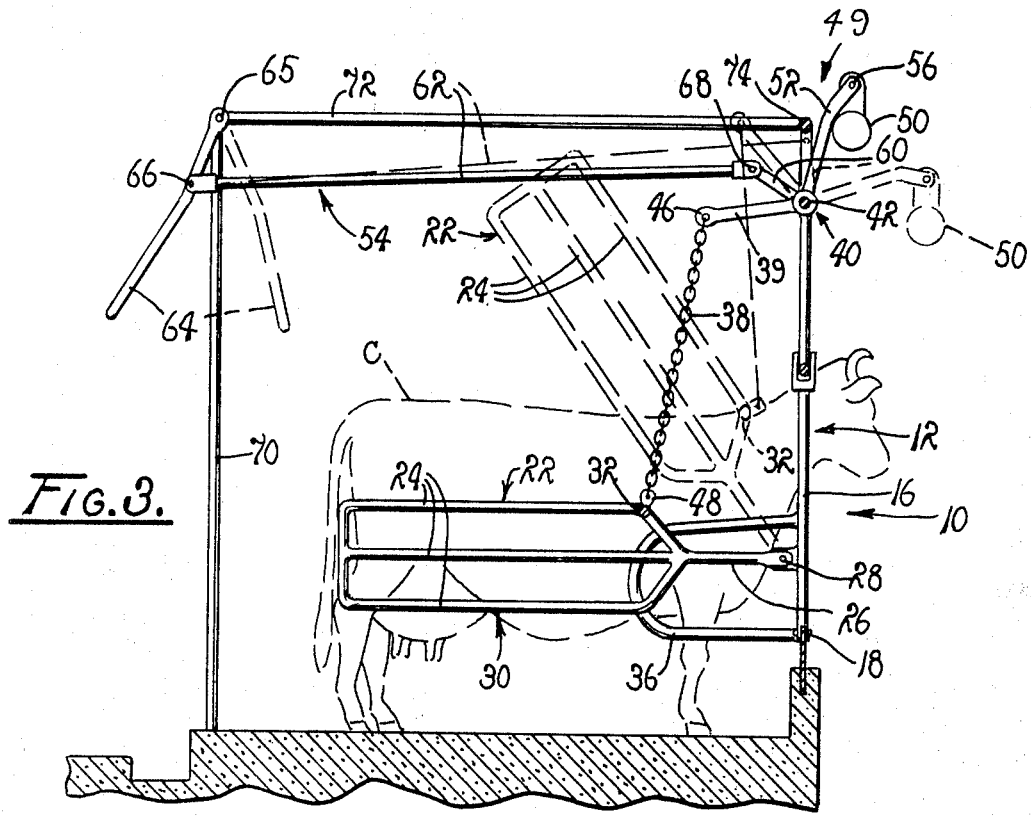
FIG. 3 is a side elevation of the restraining device taken generally along line 3—3 of FIG. 2.
Figure 4:
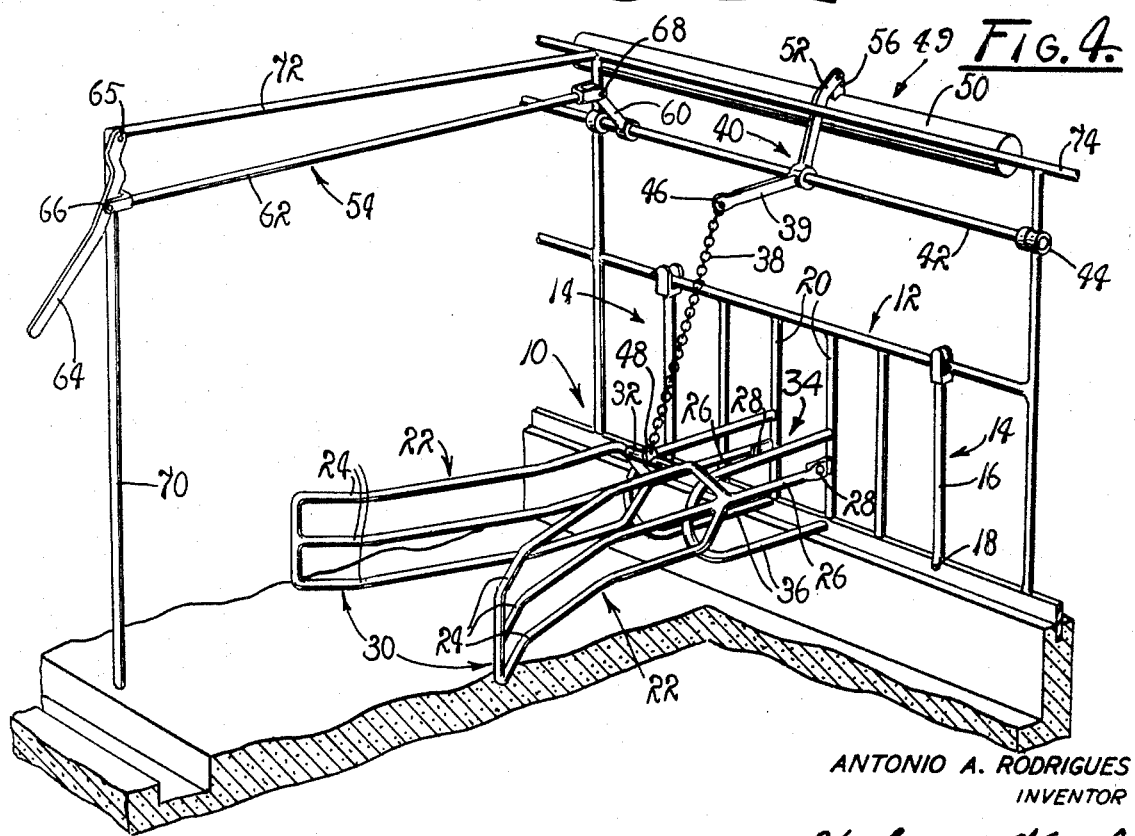
FIG. 4 is a fragmented, perspective view of the restraining device shown in FIGS. 1 through 3.

As best illustrated in FIGS. 2 and 3, the bell cranks 40 are fixed to a common rotatable shaft 42. The shaft 42, in turn, is supported for oscillatory rotation by a plurality of laterally spaced bearing blocks 44 mounted on stanchions 45. Hence, simultaneous oscillation of the plurality of bell cranks serves to displace the units 30 in vertical displacement, about the pivot pins 28. Thus the units 30 can be elevated in pivotal rotation to a first position for accommodating a reception of a plurality of animals, such as cows C, and subsequently lowered to a second position wherein the restraining rails 22 are extended in a substantially horizontal position confining the animals and maintaining a selected distance therebetween.

While the cows C are confined by the units 30 in side-by-side pairs, as best illustrated in FIG. 1, it is to be understood that the units 30 can be so arranged as to be deployed, when in an operative position, between the animals of each pair, as well as between the pairs of animals.

As presently employed, the bell cranks 40 are of a common configuration. Additionally, the arms 39 are arranged in a coplanar relationship so that the associated separator units 30 can simultaneously be elevated as rotation is imparted to the shaft 42.

It is, of course, to be understood that each of the tension member 38 is pivotally coupled at a first end thereof to a distal end of one of the arms 39 while its opposite end preferably is coupled with a coupling bar 32 of a separator unit 30. As a practical matter, the tension members 38 can be coupled with the bell cranks 40 through a plurality of eyes 46 formed in the end of the arms while the opposite ends thereof are coupled with the units 30 through couplings 48 each being fixedly secured to a transverse coupling bar 32 and having an eye formed therein for receiving an end of a tension member 38.

A simultaneous rotation of the bell cranks 40 is achieved through an activation of an association actuator 49, FIG. 3. The actuator 49 includes a mass 50 suspended from a plurality of arms 52 extended from the bell cranks 40 and angularly related to the arms 39. Activation of the actuator is effected throuh a manually operable release mechanism, designated 54, coupled with the shaft 42, in a manner hereinafter more fully described. In practice, the mass 50 conforms to a bar configuration and is pivotally suspended from the distal ends of the arms 52 through a plurality of pivotal couplings 56. Due to the relatively angular relationship of the arms 39 and 52, the mass 50 is caused to act in a counterbalancing capacity to impart a torque to the shaft 42, for pivotally lifting the separator units 30. Of course, the resulting moment arms are of variable lengths, determined by the successive positions assumed by the arms 52 as the bell cranks 40 are rotated about their axis of rotation.

For reasons wich are well understood, the torque resulting from the mass 50 acting through the resulting moment arms about the common axis of rotation of the bell cranks 40 is maximized when the arms 52 of the bell cranks 40 are extended in a horizontal plane, and is decreased as the arms are caused to approach a vertical plane. Hence, the torque applied to the shaft 42, resulting from the effect of the mass 50 acting through the resulting moment arm, is increased as the bell cranks 40 are rotated in a direction such that the arms 52 pivotally are advanced from a substantially vertical plane.

In a similar fashion, torque applied to the shaft 42, resulting from the combined effective mass of the separator units 30, acting about the shaft 42 through moment arms having a length determined by the instantaneous portions assumed by the arms 39, is decreased as the effect of the mass 50 acting about the longitudinal axis of the shaft 42 is increased and, conversely, is increased as the torque developed by the mass 50 acting about the axis of rotation of the bell cranks 40 is decreased, due to the continuously varying lengths of the respective moment arms. Hence, an "over-balanced"

condition, resulting in stabilization, is achievable for the units 30, in both their first and second positions.

The hereinbefore mentioned release mechanism 54 is provided to assist workmen in initiating pivotal displacement of the separator units 30, as the units are repositioned between their first and second positions. This mechanism includes a drive linkage having an arm 60, fixed to the shaft 42 and radially extended therefrom, and pinned to a push-pull rod 62. The push-pull rod, in turn, is coupled with a manually operable lever-like handle 64. The handle 64 preferably is suspened from an overhead fulcrum by a pivot pin 65 and serves as an operative lever through which operation of the release mechanism 54 is initiated.

In practice, the push-pull rod 62 is pivotally coupled with the handle 64, through a pivotal coupling 66, and to the distal end of the arm 60 through a pivot pin 68. Of course, the handle 64 extends downwardly from the pivot pin 65 a distance sufficient to provide a moment arm of a length such that workmen can advance the rod 62 employing a practical minimal force. Similarly, the radially extended arm 60 is of a length such as to provide a moment arm, acting about the axis of the shaft 42, of a length adequate for accommodating rotation of the shaft in the presence of an applied force of a practical magnitude.

Preferably, the release mechanism 54 is supported by a pillar 70 which also is coupled with the manger 12 through a horizontally extended beam 72. However, it should be apparent that the release mechanism 54 can be supported equally as well through any suitable truss.

As hereinbefore mentioned, the effect of the combined mass of the separator units 30 acting about the pivot pins 28 of the rails 22 is maximized when the effect of the mass 50 acting about the axis of rotation for the bell cranks 40 is minimized. Thus rotational displacement of the bell cranks 40 preferably is limited by an application to the actuator of an external restraining force. Such is provided by a transverse stop-rail 74 mounted on the manger 12, above and parallel to the shaft 42, so that as the arms 52 are advanced toward their uppermost positions they engage the stop-rail and are effectively restrained thereby. Of course, the stop-rail is so positioned as to cause the restraining rails 22 to assume a selected orientation as the units 30 come to rest in their second position.

As a practical matter, the rails 22 are supported in their first position by the restraint imposed through the release mechanism 54. Of course, where so desired, suitable stops, not shown, also can be employed for limiting upward pivotal displacement of the units 30. However, such stops normally are not required for accommodating a normal operation of the restraining device 10.

OPERATION OF THE FIRST EMBODIMENT

It is believed that in view of the foregoing description, the operation of the device shown in FIGS. 1 through 4 will be readily understood and it will be briefly rviewed at this point.

With the device 10 assembled in the manner hereinbefore described, the handle 64 is supported to be pivotally advanced about its pivot pin 65 through a manual manipulation thereof. Pivotal advancement of the handle 64 serves to actuate the actuator 49.

In instances where the rails 22 of the separator units 30 are extended in substantially horizontal planes, advancement of the handle 64 toward the manger 12 serves to develop a compressive force within the push-pull rod 62 for thus forcing the rod 62 to drive the arm 60 in rotation about the longitudinal axis of the shaft 42, whereupon rotation is imparted to the shaft. Such rotation serves simultaneously to advance the arms 52 of all of the bell cranks 40 a distance sufficient to permit the mass 50, acting through the arms 52, to develop a torque about the longitudinal axis of the shaft 42 of a magnitude sufficient to assist in pivotally lifting the units 30 for advancing the units toward the inclined positions assumed by them as they come to rest in their first positions. Hence, all of the restarining rails 22 of all of the separator units 30 simultaneously are advanced about teeir respective pivot pins 28 into their first positions for accommodating a reception of a plurality of animals, such as cows to be milked. Once the rails 22 of the separator units 30 have been elevated through a distance sufficient for accommodating an unobstructed passage of animals to the manger 12, displacment of the separator units is arrested due to the restraint imposed by the rod 62 of the release mechanism 54 acting through the arm 60.

Once the animals' heads are exteded into the manger 12, the pivoted bars 16 are so positioned as to restrain the animals against fore-and-aft movement. When the heads of all of the animals being handled are appropriately positiond and secured in place, the handle 64 is grasped by an operator and reverasely displaced, about the pivot pin 65, in a direction such as to develop tension within the push-pull rod 62. Thus torque is applied to the shaft 42, through the arm 60, so that a reverse rotation simultaneously is imparted to all of the bell cranks 40, whereupon the mass 50 is lifted, as the arms 52 are advanced toward a vertical plane, for thus shortening the effective moment arm for the mass 50. Simultaneously, the moment arm of the combined effective mass of the restraining rails 22 is increased. Once the torque acting about the axis of rotation of the bell cranks 40 becomes unbalanced, the separator units 30 are pivotally displaced downwardly, by their own weight, into their second position whereupon the rails 22 are caused to extend between pairs of animals or cows C. Further advancement of the rails is, of course, precluded as the second arms 52 engage the stop-rail 74 and are restrained thereby.

In the event the rails 22 strike an animal, as the units 30 are permitted to descend into their second position, the animals respond simply by moving in appropriate lateral directions so as to afford a downward passage of the rails 22. The animals now are confined in pairs between pairs of separator units 30.

Once a handling operation, such as a milking operation, is completed, the handle 64 again is manipulated for initiating a pivotal displacement of the units 30 so that the rails 22 again are positioned in their first position, in the manner hereinbefore described, whereupon the cows are released from lateral restraint.

SECOND FORM

The second embodiment of the invention, as illustrated in FIGS. 5 and 6 of the drawings, includes certain structural components similar to components hereinbefore described in connection with the description of the first embodiment of the invention, as illustrated in FIGS. 1 through 4. Therefore, for the sake of simplicity, similar structural components are similarly designated.

Additionaly, it should be apparent that the structure of the hereinbefore described first form of the invention is not deemed to be mutually exclusive with respect to the structure of the hereinafter described second form of the invention. Hence, an interchange of structural components is deemed to be practical and is contemplated within the scope of the instant invention.

While the hereinbefore described first form of the invention functions quite satisfactorily for its intended purpose, the second form of the invention is particularly suited for use in an environment wherein a large number of animals simultaneously are being handled and/or a practical source of pressurized fluid exists.

Furthermore, use of the form of the invention illustrated in FIGS. 5 and 6 is preferred where cows being handled tend to be of a non-uniform size. In such instances, the device is adjusted to "fit" larger cows, therefore, smaller cows are afforded a greater opportunity for lateral movement out of restraining engagement with the rails 22. This, of course, tends to cause the workmen to encounter difficulty in gaining access to the udders of the cows. In order to facilitate access to the udders, each of the support bars 26, of the second form of the invention, also is provided with an additional pivot coupling 100 which accommodates limited lateral displacement of each of the rails 22 for permitting the workmen to "follow" the cows as the cows attempt to move in a direction away from the rails.

As a practical matter, each of the pivotal couplings 100 includes a pivot pin 102 about which the associated rail 22 is, in operation, moved. Accordingly, each of the rails is supported to be moved in pivotal lateral displacement about the pivot pin 102, as well as in a vertical plane about the pivotal pin 28 so that ready access to the cows for handling purposes is afforded.

In order to accommodate opposed lateral displacement of the rails 22 of each of the separator units 30, the rails are coupled toether through a telescoping assembly 104, best shown in FIG. 6. This assembly serves to inhibit relative movement of the rails of the separator unit 30, in vertical directions, while accommodating limited relative movement of the rails 22 in lateral directions.

Each of the telescoping assemblies 104 is provided with a pair of laterally telescoping units, including a first telescoping unit 106 vertically oriented with respect to a second telescoping unit 108. The units 108 are of a design similar to that of the telescoping units 106, accordingly, a detailed description of the telescoping unit 106, shown in FIG. 6, is deemed sufficient for providing a complete understanding of these units.

The unit 106 includes a first transverse tube 110 coupled, as by welding, with a vertically oriented cylindrical body 111, thus forming a T-coupling, while a second transverse tube 112 similarly is coupled with a vertically oriented cylindrical body 113. It is important to note that the tube 110 has an inside diameter slightly greater than the outside diameter of the tube 112. Thus it is possible to insert the tube 112 within the tube 110 so that a telescoping relationship is established therebetween. Each of the bodies 111 and 113, in effect, serves as a tubular sleeve concentrically receiving a vertically oriented pivot pin 114 having its opposite ends suitably fixed to a pair brackets 115 secured to selected bars 24 of the rails 22.

Therefore, it should be apparent that as a rail 22, of a given separator unit 30, is displaced in a lateral direction about its associated pivotal coupling 100, the tubes 110 and 112 are caused to undergo telescoping, axial displacement. Furthermore, rotation of the bodies 111 and 113, about the pivot pins 114, simultaneously is accomodated so that any tendency of the tubes to bend is avoided.

Accordingly, it is to be understood that the telescoping assembly 104 of each of the separator units 30 serves to couple the rails 22 of the separator unit 30 in a manner such that the rails 22 can be displaced in mutually opposed, horizontal directions, while they are restrained against mutual displacement in vertical directions. Consequently, the rails 22 of each of the separator units 30 are, in operation, simultaneously displaced between their first and second positions for receiving and subsequently restraining cows or other animals being handled.

As shown in FIG. 5, in lieu of providing a bell crank 40 above each of the units 30, there is provided an arm 116 radially extended from the rotatably supported saft 42 which serves to support the unit in a manner similar to that in which each of the arms 39 is employed for a similar purpose.

The arm 116 is rigidly fixed to the shaft 42 through a tubular collar 118 pinned or otherwise suitably secured to the shaft 42. As a practical matter, the arms 116 serve a purpose quite similar to that of the arms 39 of the bell cranks 40, and similarly are provided with eyes 46 located at their distal ends for coupling the arms 116 with the tension members 38.

Secured to the depending end of each of the tension members 38, opposite the eyes 46, there is a coupling ring 120. This ring functions as a link for joining the tension member 38 with a depending spring 122 which, in turn, is connected with the uppermost bars 24 of a pair of rails 22 through an intermediate bifurcated length of chain 124. The bifurcated length of chain 124 is, in practice, connected with the spring 122 through a ring 125. The distal ends of the lengths of bifurcated chains 124 also are provided with eyes, designated 126, welded to brackets 127 fixed to the uppermost bars 24 for effecting a coupling therebetween. Thus, the pair of rails 22, of each of the separator units 30, is suspended from a single one of the arms 116 through a spring 122 so that the rails continuously are urged in mutual closing displacement as well as displacement in an elevating direction.

It is to be understood that by coupling the tension members 38 to the rails 22 through the springs 122, the rails 22 resiliently are supported against both separating and depressing displacement through an angularly applied force having vertical and horizontal components determined by the spring constant of the springs. However, each of the rails 22 can be pivoted in both lateral and vertical directions, against the applied force of the springs, readily for accommodating access to cows or other animals restrained thereby.

In order to pivotally displace the rails 22 between their first and second positions, hereinbefore described, the form of the invention illustrated in FIGS. 5 and 6 is provided with a fluid actuator 128, in lieu of the release mechanism 54 employed in the device illustrated in FIGS. 1 through 4.

The actuator 128 preferably is a pneumatic actuator which includes a barrel 129 pivotally supported on one of the stanchions 45, by a suitable bracket 130 fixed thereto. Seated within the actuator for axial reciprocation from the barrel 129, there is a shaft 131 coupled with a piston of suitable design. This shaft is coupled at its distal end in a driving relationship with the distal end of a radially extended arm 132 through a clevis and pivot pin 134. The arm 132 is fixed to and radially extended from the shaft 42 in a manner such that reciprocation imparted to the shaft 131 serves to impart rotation to the shaft 42 about its longitudinal axis. While the fluid actuator 128, as employed, is an air cylinder, it is to be understood that any suitable actuator can be employed equally as well.

In practice, air under pressure is delivered to the actuator 128, through a suitable system, which includes a manually operable valve, not shown. This delivery of air serves to drive the shaft 131 from the barrel 129 of the actuator 128 for thus imparting pivotal displacement to the arm 132 whereupon the shaft 42 is rotated in the bearing blocks 44. Concurrently therewith, the arms 116 are pivotally displaced for thus simultaneously elevating the rails 22 of the units 30. Of course, upon a release of the air delivered to the barrel 129 of the actuator 128, coupled with the weight of the units 30, acting about the shaft 42 through the arms 116, the shaft 131 is caused to return into the barrel of the actuator and the separator units 30 return to their horizontal orientation.

OPERATION OF THE SECOND EMBODIMENT

It is believed that in view of the foregoing description of the operation of the first form of the invention, illustrated in FIGS. 1 through 4, the operation of the second form shown in FIGS. 5 and 6 will be readily understood, however, it briefly is reviewed at this point.

In order to elevate the rails 22 of each of the separator uits 30 to their first position, for simultaneously receiving milch cows, or other animals, pressurization of the actuator 128 is effected for causing the shaft 131 to extend and impose rotation on the shaft 42 through the arm 132. As the shaft 42 is rotated, in an appropriate direction, the arm 116, for each of the units 30, pivotally is displaced for simultaneously elevating the rails 22. Thus the rails 22 are caused to assume their first position as the stroke of the operative shaft 131 is maximized.

The animals being handled now are permitted to advance to the manger 12, whereupon the bars 16 are repositioned for locking the heads of the aimals in the manger for thereby imposing fore-and-aft restraint on the aimals.

Once the heads of all of the animals being handled are positioned and locked within the manger 12, an operator, through a manipulation of the aforementioned valve, releases the pressure developed within the actuator 128 for permitting the rails 22 of each of the separator units 30 to descend and be positioned in their second position, wherein they are extended horizontally between adjacent pairs of the animals.

It is important to note that during milking operations, should a workman approach a cow for purposes of gaining accesss to the cow's udders, the cow may move laterally away from the workman. However, the workman is afforded an opportunity to "follow" the cow simply by pivotally displacing the adjacent rail 22 about the pivot pin 102. In the event difficulty is encountered because of the elevation of the rail 22, the workman can depress the interfering rail, against the applied force of the spring 122, by manually forcing the rail downwardly so that access to the cow's udder is afforded. Of course, should the cow attempt to kick the workman as the workman attaches a milking machine to the cow's udder, the cow's foot encounters the adjacent rail 22 and the workman is protected.

Of course, once the milking equipment has been secured to the cow, the rail 22 is permitted to move toward the other rail 22 of the pair of rails as the tubes 110 and 112 continuously are urged to assume a telescoped relationship under the influence of the laterally directed force components imposed thereon by the spring 122.

As previously described, with respect to the form of the invention shown in FIGS. 1 through 4, once an animal handling operation, such as a milking of cows, has been completed, te rails 22 again are elevated to their first position whereupon the cows are released from the mangers.

The operation of the described restraining device is repeated as often as required to complete an animal handling operation.

In view of the foregoing, it should readily be apparent that the devices embodying the instant invention provide a practical solution to the complex problem of protecting workmen, equipment, and animals against unwanted contact during handling operations.

Although the invention has been herein shown and described in what are conceived to be the most practical and preferred embodiments, it is recognized that departures may be made therefrom within the scope of the invention, which is not to be limited to the illustrative details disclosed.

Having described my invention, what I claim as new and desire to secure by Letters Patent is:

1. In a restraining device for substantially confining milch cow, the improvement comprising:

A. at lease one, elongated restraining rail pivotally mounted on said device for oscillation in a substantially vertical plane between first and second angularly related positions and adapted to impart lateral support for a milch cow during milking operations; and B. support means mounted on said device and including means for pivotally mounting said rail for oscillation in a substantially horizontal plane, whereby said rail moves in orthogonally related planes.

2. The improvement of claim 1 wherein the support means includes a rotatable shaft for coupling the rail, and further includes suspension means for suspending said rail from said shaft.

3. The improvement of claim 2 further comprising actuating means including a pneumatic actuator coupled with said shaft for pivotally displacing said rail about a horizontal axis.

4. The improvement of claim 3 wherein the elongated rail is shaped to an approximate configuration of a lateral surface of the milch cow.

5. A restraining device for substantially confining a plurality of quadrupeds during handling operations comprising:

A. means including a plurality of yokes for simultaneously receiving and securing the heads of a plurality of quadrupeds;

B. a plurality of elongated restraining rails arranged in mutual parallelism, and means pivotally mounting said rails for oscillation in substantially orthogonally related planes;

C. support means operatively associated with said rails for supporting the rails in a first position, whereby the the plurlity of quadrupeds is afforded reception by the device, and for supporting said rails in a second position angularly related to said first position, for simultaneously engaging and confining said plurality of quadrupeds; and D. an actuator coupled with said rails for displacing the rails between said first and second positions.

6. The device of claim 5 wherein the actuator includes a fluid-driven shaft supported for axial reciprocation.

7. The device of claim 5 further including restraining means for restraining the rails of adjacently disposed pairs of rails against relative displacement in vertical directions, while accommodating relative displacement of said rails in horizontal directions.

8. The device of claim 7 wherein said restraining means includes means for imposing on said rails resilient restraint against displacement in horizontal directions.

9. A restraining device for substantially confining a plurality of quadrupeds received in side-by-side relationship comprising:

A. a plurality of pairs of elongated restraining rails pivotally supported for oscillation in orthogonally related planes;

B. support means including a pneumatic cylinder and a tension spring operatively associated with said rails for resiliently supporting the rails in an inclined first position, and subsequently in a second position angularly related to said first position; and C. means including a telescoping assembly for coupling the rails of each pair in a manner such that mutual displacement in lateral directions is accommodated while mutual displacement in vertical directions is precluded.

10. The device of claim 9 wherein the telescoping assembly includes a plurality of telescoping units, each having a pair of concentrically related, axially reciprocable tubes each tube being supported by one of said rails for oscillation about an axis of rotation normally related to the longitudinal axis thereof.

11. In a restraining device for laterally confining a plurality of quadrupeds received in a side-by-side relationship, the improvment comprising:

A. a plurality of parallel, elongated restraining members adapted to be disposed between adjacent quadrupeds;

B. means pivotally supporting each of said rails for substantially horizontal oscillation about a vertical axis and also for substantially vertical oscillation about a horizontal axis, whereby each of the restraining members is supported for pivotal oscillation in orthogonally related planes; and C. means for resiliently supporting said restraining members against horizontal oscillation for thereby imposing on said quadrupeds resilient lateral restraint.

\* \* \* \* \*